Dec. 2, 1958     L. R. WOODS     2,862,385
VIBRATION TABLE
Filed Aug. 8, 1955
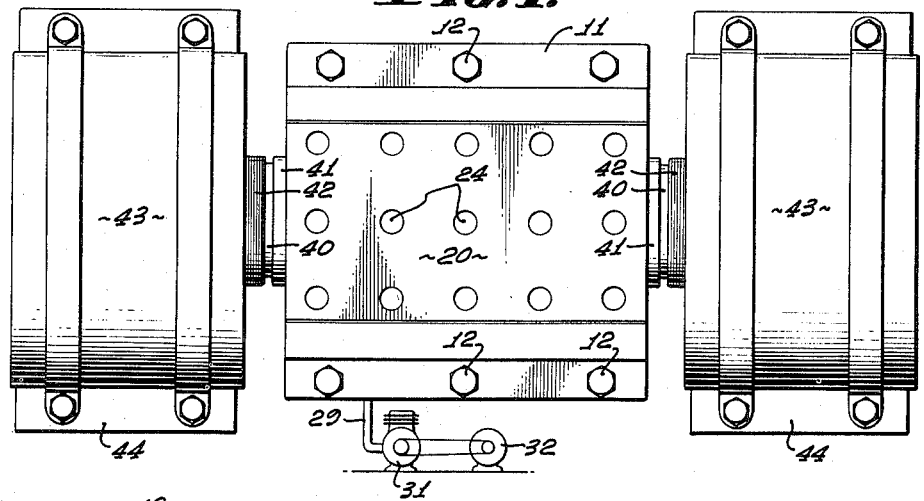
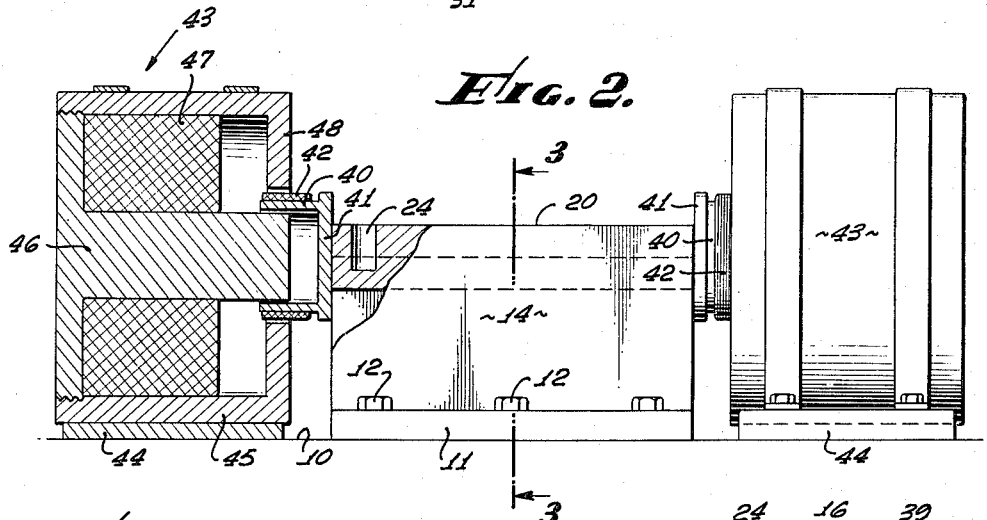
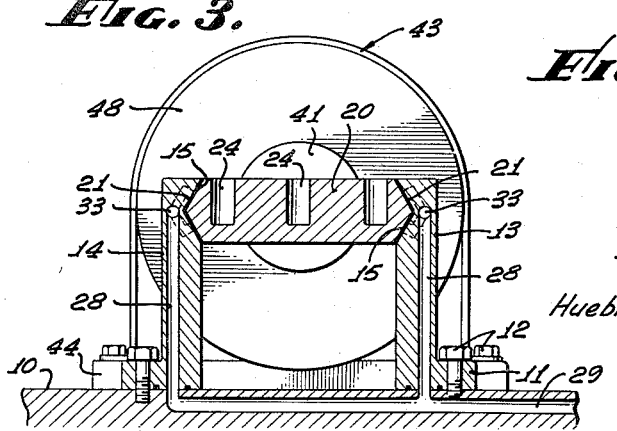
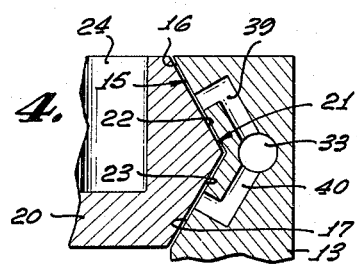
LEROY R. WOODS
INVENTOR.
Huebner, Beehler, Worrel & Herzig
BY
ATTORNEYS.

United States Patent Office 2,862,385
Patented Dec. 2, 1958

2,862,385

VIBRATION TABLE

Leroy R. Woods, Whittier, Calif., assignor to International Electronic Research Corporation, Burbank, Calif., a corporation of California Application August 8, 1955, Serial No. 527,077

5 Claims. (Cl. 73—71.6)

The invention relates to vibrating machines and more particularly to a vibrating machine capable of testing relatively small objects for break down at vibrations of extremely high frequency. The object of machines of this general character is to simulate in the laboratory to as great a degree as is possible conditions that may exist in actual use of the particular specimen or object to be tested. Recently there has been considerable emphasis on high frequency vibration brought about by conditions prevalent in the manipulation of guided missiles and in the requirements existing in electronc equipment of jet aircraft. Extension of these programs has been productive of use of a growing number of items of equipment which need to be carefully constructed to withstand a tendency to break down when subjected to high frequency vibrations. To test such larger specimens vibrating machines of greater capacity have been demanded and when it is appreciated that where such extremely high frequencies are used, the bigger the machines have become the more unwieldy they have become for testing purposes.

Heretofore certain high frequency vibration equipment has been powered by a coil in a magnetic field, the coil being mounted and retained by flexible arms. In present equipment the load is entirely supported by those flexible arms which places a definite limit on the useful load. Should there be motion in a direction at right angles to movement of the flexible arms, such motion is only lightly restricted by the stiffness of the arms. Consequently when the device is loaded, the load must be kept as near as possible to the center of the axis of an armature in the magnetic field which is supported by the flexible arms. Because of the pivot-like movement due to one end of the arm being anchored, there is also a slightly sidewise movement of the armature and the associated load. As the weight of the load increases the sidewise flexing force increases appreciably and this necessitates stiffening the flexible arms to a considerable degree. The stiffening, however, decreases the efficiency and consequently as greater loads are experienced in the devices to be tested, the building of existing vibrating machines to accommodate those loads results in a substantial decrease in efficiency and effectiveness.

Among the objects of the invention is to provide a new and improved air floated support for a table or platform to render it virtually frictionless under a great variety of load patterns.

It is further among the objects of the invention to provide a new and improved vibration testing device which is influenced to a very minimum degree by added weight of the load applied to it when large specimens are to be tested.

Another object of the invention is to provide a new and improved vibrating table which is mounted in such fashion that frictional resistance to movement of the table is reduced to an ultimate minimum, thereby enabling the vibrating force to be completely utilized for imparting vibrations to the vibrating table.

Still another object of the invention is to provide a new and improved vibrating table which vibrates with extreme freedom in a chosen direction and which is highly resistant to unwanted vibrations in other directions regardless of the balance of the load or the weight of the load.

Still further among the objects of the invention is to provide a vibrating table which is supported by an air film in such manner that the table is virtually frictionless regardless of the balance of loading and which is highly effective in the vibration testing of specimens of a great variety of weights, forms, and character.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a plan view of a form of vibration testing device illustrating the invention.

Figure 2 is an elevational view partially in section.

Figure 3 is a cross-sectional view taken on the line 3—3 of Figure 2.

Figure 4 is an enlarged fragmentary cross-sectional view showing the mounting of the table on the columns.

In the embodiment illustrated in the drawings the machine is shown resting upon a support 10, which may be stationary or movable. The vibrating device itself comprises a base 11 stationarily secured to the support by means of bolts 12. The base has extending upwardly therefrom columns 13 and 14 on opposite sides of the base and in spaced parallel alignment. Adjacent the tops of the columns and on the inside face of each is a slot 15 preferably V-shaped with the apex of the V extending outwardly, the slot in each case being located at the top of the column. Each of the V-shaped slots has an upper portion 16 and a lower portion 17.

A table 20 is mounted between the columns, the table being provided with outwardly extending parallel V-shaped edges 21, each having an upper portion 22 and a lower portion 23 complementary to and mounted in close association with corresponding upper and lower portions 16 and 17 of the respective V-shaped slot 15 of the column. In the example chosen for the purpose of illustration the depth of the table is approximately the same as the spread of the V-shaped slots.

The table is provided with a plurality of stations 24 of appropriate size and configuration depending upon the type of specimen to be tested.

In each column is a system of air passages 28 connected to a main duct 29 which communicates by suitable piping with a source of high pressure air indicated by a compressor 31 operated by a motor 32. In the example shown the main duct lies beneath the undersurface of the support 10.

Each of the air passages 28 communicates with a longitudinally extending manifold passage 33 from which extend upper branches 39 and lower branches 40. The branches communicate with upper and lower portions 16 and 17, respectively, of the V-shaped slots 15. When air pressure is introduced into the manifold passage and the upper and lower branch passages, the pressure of air will force the upper and lower portions of the V-shaped edges of the table away from the corresponding portions of the V-shaped slots by a distance measured in a few thousandths of an inch, this distance being a calculated distance built into the width of the table and depending to a degree upon the expected loading and the amount of air pressure expected to be needed to float the table on a film of air established in spaces between the V-shaped projections of the table and the V-shaped slots of the columns.

To produce desired vibrations in the table there is provided at each end of the table a core 40 secured to the respective end of the table by means of a core base 41. Around each core is a coil of wire 42. Mounted upon the support 10 at each end of the base 11 is an electromagnet 43 comprising a frame 44 supporting an exterior pole piece 45 and an interior pole piece 46. A coil 47 of electric wire is wound about the pole piece 46 and within the pole piece 45. The pole piece 45 has extensions 48 which surround the coil 42 in close proximity thereto. When the electromagnets are energized and a suitable current is passed through the coils 42 in opposite phase at opposite ends of the table 20, the resulting vibration imparts a push-pull movement longitudinally with respect to the table which, being floated upon the high pressure air film, readily vibrates in a to and fro motion. The table may be loaded with objects to be tested indiscriminately with respect to balance and mass. Should there be a greater load at one end than at the other, manipulation of the air pressure to a sufficiently high pressure will float both ends at equal distances from the bottoms of the V-shaped slots and there will be no unbalance in the mounting of the table. The same high pressure balance will be maintained should the table be loaded heavier on one side than on the other. Regardless of weight of the objects mounted on the table, a sufficient amount of pressure can be generated to establish the floating condition so that the effectiveness of the vibration generating media is unaffected by any unbalance and limited only by the inertia of the table and the load mounted thereon.

In a high frequency vibration table design of the type herein described, there being no springs or flexures present and no supporting means, there will be no resonant frequency to combat, other than in the table itself. The air supported design eliminates the seismic displacement effects of static loading on the drive system and reduces the effective friction to an extremely low value. By reason of the balanced condition maintained by the air pressure system, when the load is installed upon the table no undue care need be observed. The frequency range of the device is exceedingly great and its extreme simplicity presents a machine difficult to damage with respect to its few relatively moving parts and the simplicity and effectiveness is a distinct advantage in the hands of operators who may not be too highly skilled in mechanisms of this type.

Although the embodiment chosen especially emphasizes a vibration testing machine, it will be appreciated that the air float principle is of great advantage in supporting a table or platform for a great variety of purposes and is not, moreover, confined to a to and fro reciprocation of any particular limited magnitude.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A vibration testing machine comprising a stationary base, a table mounted on the base adapted for the reception thereon of objects to be subjected to vibrations, said base having upstanding columns on opposite sides and said columns having parallel longitudinally extending slots depressed outwardly into respectively inwardly facing sides of the columns, said slots having a portion lying above a horizontal plane and a portion lying below a horizontal plane, said table having outwardly extending edges fitting into the slots with a clearance of substantially a few thousandths of an inch, air passages in said columns, said passages having branches opening directly into upper and lower portions of the slots, and a source of high pressure air communicating with said passages whereby to provide an air float for said table, and vibration-producing media in spaced relationship with the table adapted to vibrate said table in a horizontal plane.

2. A vibration testing machine comprising a table adapted for the reception thereon of objects to be subjected to vibrations, upstanding columns on opposite sides of the table and said columns having parallel longitudinally extending slots depressed outwardly into respectively inwardly facing sides of the columns, said table having outwardly extending V-shaped edges fitting into the slots with a very small clearance, air passages in said columns, a source of high pressure air communicating with said passages whereby to provide an air float for said table, and high frequency vibration-producing media in communication with the table adapted to vibrate said table in a direction lengthwise of said slots, said vibration-producing media comprising a pair of pole pieces spaced one from another at one end of the table in longitudinal alignment therewith, a coil between the pair of pole pieces and spaced from said pole pieces, said coil being attached to the respective end of the table, said coil being subject to high frequency electric impulses and adapted to vibrate said table at a corresponding high frequency.

3. A vibration testing machine comprising a stationary base, a table mounted on the base adapted for the reception thereon of objects to be subjected to vibrations, said base having upstanding columns on opposite sides and said columns having parallel longitudinally extending V-shaped slots depressed outwardly into respectively inwardly facing sides of the columns, said table having outwardly extending V-shaped edges fitting into the V-shaped slots with a clearance of the magnitude of a few thousandths of an inch, air passages having branches opening directly into upper and lower portions of the V-shaped slots, a source of high pressure air communicating with said passages whereby to provide an air float for said table, and high frequency vibration-producing media on the base physically spaced from and in electromagnetic communication with the table adapted to vibrate said table in a direction lengthwise of said slots, said vibration-producing media comprising a pair of pole pieces at opposite ends of the table in longitudinal alignment therewith, a coil between each pair of pole pieces and attached to the respective end of the table, said coils being spaced from the respective pole pieces and being subject to high frequency electric impulses and adapted to vibrate said table at a corresponding high frequency.

4. A vibration testing machine comprising a stationary base, a table mounted on the base for reception thereon of objects to be subjected to vibrations, said base having columns on opposite sides of the base, a pair of opposite inwardly facing support areas on the columns and a pair of outwardly facing support areas on the table respectively and adjacent the first named pair of support areas, means forming parallel longitudinally extending slots depressed in opposite directions into the support areas of one of said pairs, said slots having a portion lying above a horizontal plane and a portion lying below said horizontal plane, means forming outwardly extending edges on the other of said pairs of supporting areas fitting into the slots with a clearance of substantially a few thousandths of an inch, air passages in said columns and said passages having branches in communication with upper and lower portions of said clearances and a source of high pressure air in communication with said passages whereby to provide an air float for said table, and vibration-producing media in spaced relationship with the table adapted to vibrate said table in a horizontal plane.

5. A vibration testing machine comprising a stationary base, a table mounted on the base adapted for reception thereon of objects to be subjected to vibrations, said base having columns on opposite sides having inwardly facing areas and said columns having parallel longitudinally extending slots depressed outwardly into said areas, said slots having a portion lying above a horizontal plane and a portion lying below said horizontal plane, outwardly facing areas on said table having outwardly extending edges fitting into the slots with a clearance of substantially a few thousandths of an inch, air passages in said columns, said passages having branches communicating with upper and lower portions of the slots and a source of high pressure air communicating with said passages whereby to provide an air float for said table, and vibration producing media in spaced relationship with the table adapted to vibrate said table in a horizontal plane.

References Cited in the file of this patent

UNITED STATES PATENTS

| | | |
|---|---|---|
| 2,353,150 | Dietz | July 11, 1944 |
| 2,686,427 | Ellett et al. | Aug. 17, 1954 |
| 2,692,803 | Gerard | Oct. 26, 1954 |
| 2,710,234 | Hansen | June 7, 1955 |